United States Patent
Zhu et al.

(10) Patent No.: US 10,140,399 B2
(45) Date of Patent: Nov. 27, 2018

(54) CORNER DATABASE GENERATOR

(71) Applicant: ARM Limited, Cambridge (GB)

(72) Inventors: Hongwei Zhu, San Jose, CA (US); Mouli Rajaram Chollangi, Fremont, CA (US); Hemant Joshi, San Ramon, CA (US); Yew Keong Chong, Austin, TX (US); Satinderjit Singh, Fremont, CA (US); Betsie Jacob, Fremont, CA (US); Neeraj Dogra, Gilroy, CA (US); Sriram Thyagarajan, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/387,373

(22) Filed: Dec. 21, 2016

(65) Prior Publication Data
US 2018/0173822 A1   Jun. 21, 2018

(51) Int. Cl.
*G06F 17/50* (2006.01)
*G06F 17/30* (2006.01)

(52) U.S. Cl.
CPC .... *G06F 17/5009* (2013.01); *G06F 17/30289* (2013.01); *G06F 17/5068* (2013.01); *G06F 2217/12* (2013.01)

(58) Field of Classification Search
CPC ................................................ G06F 17/5009
USPC ......................................................... 716/110
See application file for complete search history.

(56) References Cited

U.S. PATENT DOCUMENTS

| | | | | |
|---|---|---|---|---|
| 7,788,620 B1* | 8/2010 | Xue | ..................... | G06F 17/5072 716/113 |
| 8,707,234 B1* | 4/2014 | Ye | ....................... | G06F 17/5036 716/106 |
| 8,719,752 B1* | 5/2014 | Ye | ....................... | G06F 17/5063 716/102 |
| 2005/0034086 A1* | 2/2005 | Hamlin | ................... | G06F 17/50 716/52 |
| 2009/0228850 A1* | 9/2009 | Bhanji | ............... | G06F 17/5031 716/113 |
| 2011/0276933 A1* | 11/2011 | Banerji | ............... | G06F 17/5031 716/108 |
| 2012/0159414 A1* | 6/2012 | Ghanta | ............... | G06F 17/5031 716/113 |

(Continued)

*Primary Examiner* — Suchin Parihar
(74) *Attorney, Agent, or Firm* — Pramudji Law Group PLLC; Ari Pramudji

(57) ABSTRACT

Various implementations described herein are directed to a computing device. The computing device may include a mapper module that receives a user configuration input of a destination corner for building a destination corner database. The mapper module may include a decision making engine that decides fabrication parameters for building the destination corner database based on the verified user configuration input and memory compiler metadata. The computing device may include a builder module that performs a simulation of the destination corner based on the fabrication parameters, collects simulation results data associated with the simulation, and builds the destination corner database for the destination corner based on the simulation results data and source corner data. The computing device may include a memory compiler that accesses the destination corner database and generates memory instance structures and their electronic digital automation (EDA) views for the destination corner based on the destination corner database.

20 Claims, 10 Drawing Sheets

(56) References Cited

U.S. PATENT DOCUMENTS

2017/0168105 A1* 6/2017 Kurtz .................... G01R 29/26

* cited by examiner

CORNER DATABASE GENERATOR

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

FIG. 1 illustrates a block diagram of a system 100 having a conventional memory compiler 108 as known in the art. The memory compiler 108 is a software suite bundled with circuit design and data. The memory compiler 108 is utilized to generate memory instance models 156 and their electronic digital automation (EDA) views (e.g., liberty models) for a given corner, which is defined by process, voltage, temperature, metal-stack, VT mode, etc.

To generate an EDA view for a given corner of a given instance, the user inputs a memory instance (e.g., bits, words, mux values, etc.) and corner configuration 114 (e.g., process, voltage, temperature, etc.) into the memory compiler 108. The memory compiler 108 accesses one or more corner databases 150 for the given corner and retrieves the data needed to generate the memory instance model 156 and the EDA view. The memory model generator 154 uses the retrieved data to generate the memory instance model 156 and the EDA view in a defined format.

The one or more corner databases 150 may be shipped to the user with the memory compiler 100. Traditionally, if the user desires to generate a new corner, the new corner is typically generated by a memory compiler vendor and then shipped to the user. Unfortunately, the conventional memory compiler 108 does not have capability or flexibility to allow the user to generate the new corner for themselves.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to various schemes and techniques for memory compiler corner database generation in memory applications. For instance, some implementations described herein refer to a scheme and/or technique to utilize existing memory compiler corner databases (i.e., base or source corner databases) and minimum characterized data to generate a new corner database (i.e., a destination corner database). As described herein, the memory compiler corner database generator may generate memory instance structures and/or their electronic digital automation (EDA) views for a new destination corner. Generally, in some cases, a corner may be defined by process, voltage, temperature, metal-stack, VT mode, etc., to generate an EDA view for the corner, and the memory compiler corner database generator provides or generates a database of the corner. The database includes memory instance data and information, arc data and information, characterized numbers, etc. An arc may be a timing arc, a power arc, a leakage arc, or a noise arc. The arc may represent all or only a portion or "partial" of the total of the timing, power, leakage, or noise arc. As described herein, the memory compiler corner database generator may enable users or designers to define a new corner and generate a database (or corner database) of the new corner for themselves.

Accordingly, various schemes and techniques for generating corner databases in memory applications will now be described with reference to FIGS. 2A-6.

Figure 1:
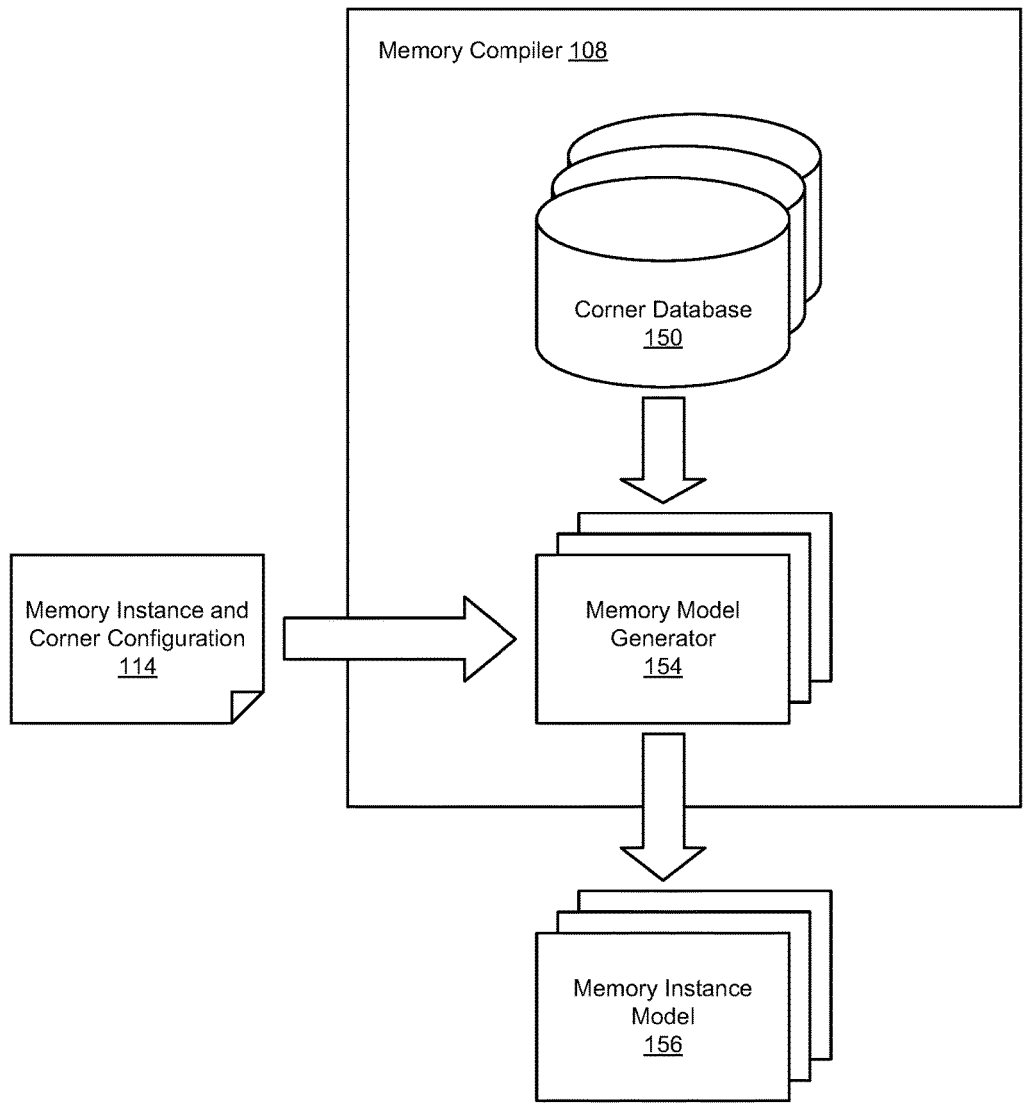
FIG. 1 illustrates a block diagram of a system having a memory compiler as known in the art.
Figure 2A:
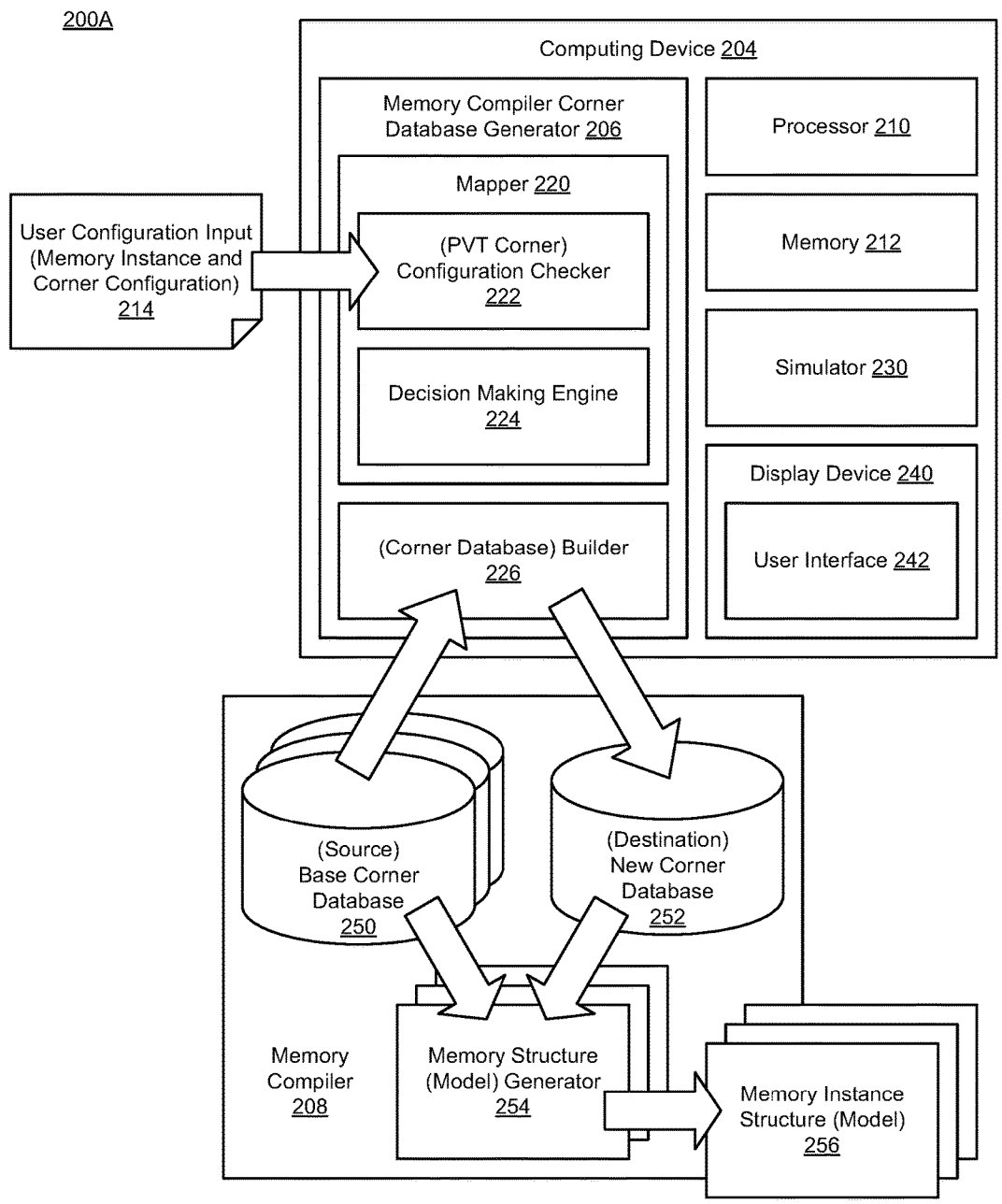
FIGS. 2A-2B illustrate various block diagrams of systems for generating corner databases in accordance with various implementations described herein.
Figure 2B:
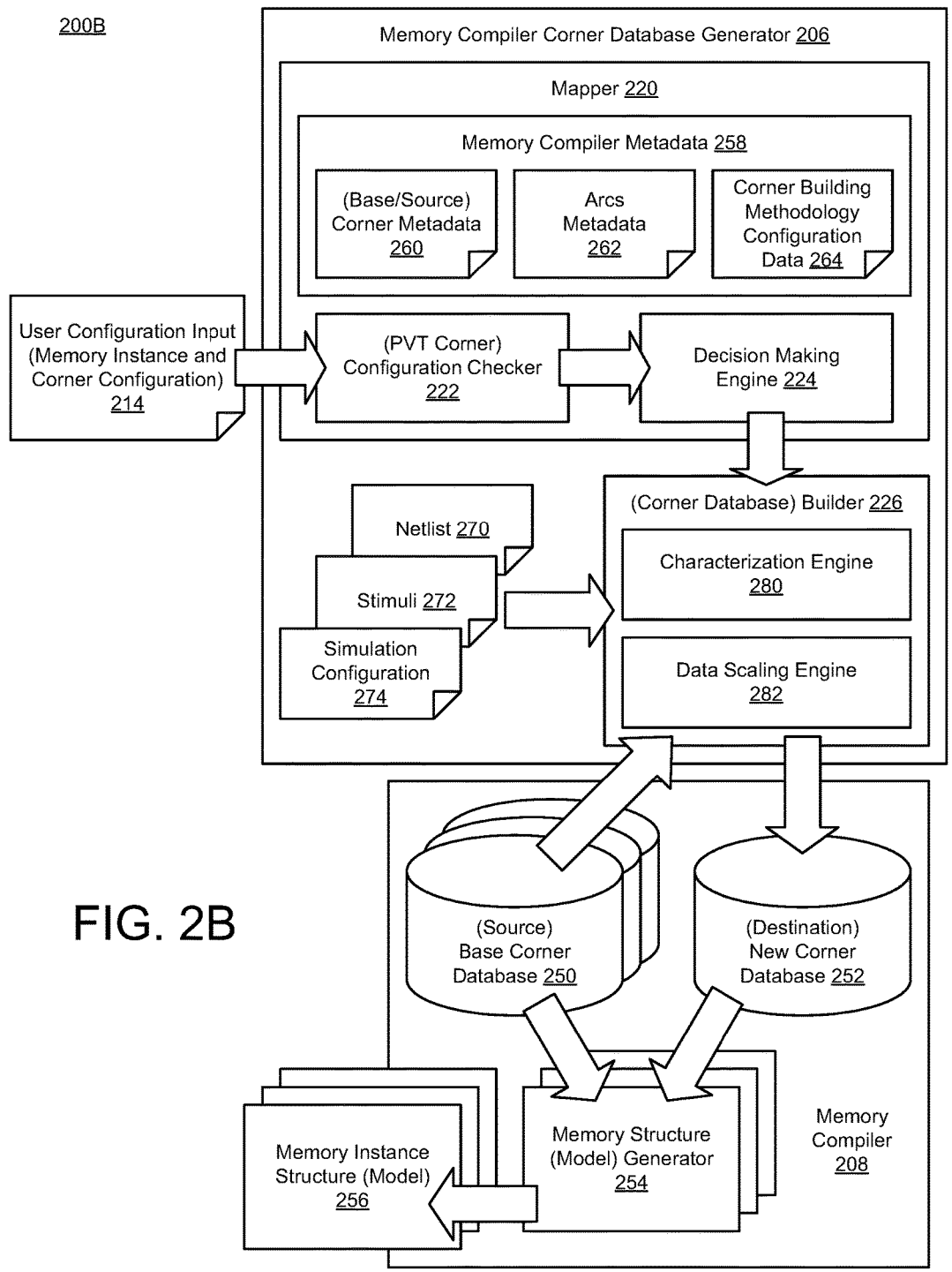

FIGS. 2A-2B illustrate diagrams of systems for generating corner databases in accordance with various implementations described herein. In particular, the system 200A of FIG. 2A includes a computer based system that is configured to generate corner databases, and FIG. 2B provides a more detailed view of various components 200B of the system 200A of FIG. 2A.

The system 200A of FIG. 2A may be associated with a computing device 204 implemented as a special purpose machine configured to generate corner databases, as described herein. In this instance, the computing device 204 may include any standard element(s) and/or component(s), including one or more processor(s) 210, memory 212 (e.g., non-transitory computer-readable storage medium), one or more database(s), power, peripherals, and various other computing elements and components that may not be specifically shown in FIG. 2A. The computing device 204 may include instructions stored on the non-transitory computer-readable medium 212 that are executable by the one or more processor(s) 210. The computing device 204 may be associated with a display device 240 (e.g., monitor or other display) that may be used to provide a user interface (UI) 242, such as, e.g., a graphical user interface (GUI). In some instances, the UI 242 may be used to receive various parameters and/or preferences from a user for managing, operating, and/or utilizing the computing device 204. As such, the computing device 204 may include the display device 240 for providing output to a user, and the display device 240 may include the UI 242 for receiving input from the user.

In various implementations, the computing device 204 may be configured to implement methodologies for generating new or destination corner databases from pre-characterized corner databases, such as, base or source corner databases. For instance, corner databases may include collected data and information used by electronic design automation (EDA) tools to perform static timing analysis (STA), power analysis, etc. of integrated circuits and circuit blocks. The different data and information available in the corner database may be based on simulation results from SPICE simulations (Simulation Program with Integrated Circuit Emphasis) performed at cell level. In some cases, the corner databases may be generated for one specific PVT (process/voltage/temperature) corner for one type of transistor (e.g., low-VT, high-VT, etc.). Designing an integrated circuit (IC) may use data and information collected in the corner database to account for possible variations (process, voltage, temperature, etc.) for different transistor, resistor, capacitor, and/or various other component types.

As shown in reference to FIG. 2A, the computing device 204 may include a memory compiler corner database generator (MCCDG) 206. The MCCDG 206 may include a mapper 220 (or mapper module) and a corner database builder 226 (or builder module). The mapper 220 and the corner database builder 226 may be utilized by the computing device 204 to cause the processor 210 to generate the new corner database 252 (or destination corner database) using a user configuration input 214 and source corner data of the base corner database 250 (or source corner database).

The computing device 204 includes the mapper 220 (or mapper module) that may receive the user configuration input 214 of a new corner from a user (or designer) for building the new corner database 252. The user configuration input 214 may be referred to as a configuration of a new PVT corner. Further, the new corner may be referred to as a destination corner, and the new corner database 252 may be referred to as a destination corner database. In some cases, the destination corner may be a process corner that is defined by variation of fabrication parameters used in applying an integrated circuit design to a semiconductor wafer. Further, the process corner may identify parameter variations within an integrated circuit that allow the integrated circuit to function properly when the integrated circuit is etched onto the semiconductor wafer.

The mapper 220 may include a configuration checker 222 that may check the syntax of the user configuration input 214 and verify validity of the user configuration input 214. The configuration checker 222 may be referred to as a configuration checker module or a PVT corner configuration checker. The destination corner is a new process, voltage, temperature (PVT) corner, and the user configuration input 214 includes data accuracy conditions and central processing unit (CPU) runtime criteria. The configuration checker 222 may access memory compiler metadata 258, and the configuration checker 222 may then verify availability of the memory compiler metadata 258 for building the destination corner database 252. The configuration checker 222 may decide or determine whether data accuracy conditions and CPU runtime criteria is achievable based on the memory compiler metadata 258. For instance, if not achievable, then the configuration checker 222 may report an error to the user (or designer). Otherwise, if achievable, then the user configuration input 214 is provided to a decision making engine 224 as the verified user configuration input.

As shown in reference to FIG. 2B, the memory compiler metadata 258 may include base corner metadata 260, arcs metadata 262, and corner building methodology configuration data 264. The base corner metadata 260 may include data and information for one or more existing base corner databases 250 that may be useable for building the destination corner database 252 as a new PVT corner database. The base corner metadata 260 may further include source corner (i.e., base corner) to destination corner (i.e., new corner) mapping data and information. The arcs metadata 262 may include data and information of one or more arcs, including a data trend of each arc for different processes, different voltages, and/or different temperatures. The data trend of each arc may be associated with different memory instance structures (and/or memory instance models) and accuracy of each arc.

In some implementations, fabrication parameters may include various different parameters that may affect fabrication and/or building of an arc in the new destination PVT corner database 252. These parameters may include, but are not limited to, process variation, environment variables (e.g., temperature, voltage, etc.), instance design variation including features causing discontinuities (e.g., as described in reference to FIGS. 7A-7C) and any other issues that may affect accuracy of simulations and building of the new destination PVT corner database 252. Further, the corner building methodology configuration data 264 may include policy related data and information on fabrication parameters for building data for each arc in the new destination PVT corner database 252. In some cases, the policy related data and information may be associated with performing characterization or scaling when building the data for each arc in the new destination PVT corner database 252.

The mapper 220 may include the decision making engine 224 that may be used to decide (or determine) various fabrication parameters for building the destination corner database 252 based on the verified user configuration input 214 and the memory compiler metadata 258. The decision making engine 224 may access the memory compiler metadata 258 and may further receive the verified user configuration input 214 for the destination corner. Then, the decision making engine 224 may decide (or determine) the fabrication parameters for building the destination corner database 252 based on the verified user configuration input 214 and the memory compiler metadata 258.

The computing device 204 further includes the builder 226 (or builder module) that may perform a simulation of the destination corner based on the fabrication parameters, collect simulation results data associated with the simulation, and build the destination corner database 252 for the destination corner based on the simulation results data. The builder 226 (or builder module) may be referred to as a corner database builder. As shown in FIG. 2B, the builder 226 may receive various input data and information, such as, e.g., data and information associated with a netlist 270, data and information associated with stimuli 272, and simulation configuration related data and information 274.

In various implementations, the netlist 270 may include data and information associated with an electronic design description of the connectivity of an electronic circuit for the destination corner. For instance, the netlist 270 may include a list of terminals (or pins) associated with various electronic components, conductors, and/or interconnects in the integrated circuit for the destination corner. Further, the stimuli 272 may include some process variations, electrical variations (e.g., voltage variations), and/or environmental variations (e.g., temperature variations) that may be associated with the integrated circuit for the destination corner. Further, the simulation configuration 274 may include data and information associated with a simulated real-world operation of integrated circuit over time, which may include behaviors, characteristics, and boundaries for developing models and/or scenarios for the integrated circuit. In some cases, the model may represent the integrated circuit itself, and the simulation may represent operation of the integrated circuit over time, so as to test the behaviors, characteristics, and boundaries of the integrated circuit in various process, voltage, and temperature (PVT) variations.

As shown in FIG. 2B, the builder 226 may include a characterization engine 280 that prepares a simulation environment for performing simulation of the destination corner based on the fabrication parameters, performs the simulation, monitors a process of the simulation, re-performs the simulation if an error occurs, and collects the simulation results data. Further, the builder 226 may include a scaling engine 282 that calculates the fabrication parameters using the simulation results data, retrieves base corner data from a base corner database, and generates destination corner data for the destination corner database based on the simulation results data and the base corner data. Further, the builder 226 may collect and store the destination corner data in the destination corner database 252 in a predefined format.

The computing device 204 may include a memory compiler 208 that accesses the destination corner database 252 and generates memory instance structures 256 (or memory instance models thereof) and their electronic digital automation (EDA) views for the destination corner based on data and information collected in the destination corner database 252. The memory compiler 208 may retrieve the destination corner data from the destination corner database 252 and then generate the memory instance structures 256 and/or their electronic digital automation (EDA) views for the destination corner based on the destination corner data retrieved from the destination corner database 252. As shown in FIG. 2B, the memory compiler 208 may include a memory structure generator 254 that may be used by the memory compiler 208 to access source corner data and information from the base (source) corner database 250 and the new (destination) corner database 252 and use the accessed data and information to generate the memory instance structures and/or their EDA views for the destination corner. The memory structure generator 254 may be referred to as a memory model generator, and the memory instances structures 25 may be referred to as a memory instance models.

In some implementations, the memory instance structures 256 (and/or models thereof) may include functional memory blocks as cells that may be tiled together, e.g., via software, to grow the memory to meet user demands. In this case, the MCCDG 206 and components thereof may be used to intelligently design and layout multiple functional memory blocks that may be tiled together as memory cells to variably generate memory systems to meet user demands. The MCCDG 206 may provide various combinations of these memory cells and interface with the memory compiler 208 to implement a memory tiling engine to generate memory based integrated circuit, various related abstractions, and characterization databases for different PVT corners.

In reference to FIG. 2A, the computing device 204 may include a simulator 230 that generates one or more simulations of an integrated circuit (IC) associated with the corner database. In some instances, the simulator 230 may include a SPICE simulator configured to generate SPICE simulations of the integrated circuit (IC). Generally, SPICE is an acronym for Simulation Program with Integrated Circuit Emphasis, which is an open source analog electronic circuit simulator. SPICE is a general-purpose software program used by the semiconductor industry to check the integrity and validity of integrated circuit designs and to thereby predict the behavior of integrated circuit designs. The use of the term SPICE may also apply to recent circuit simulator tools that are typically referred to as fast SPICE tools. These circuit simulators are similar to SPICE in that they perform a same type of simulation of the same circuits but with techniques that may improve time to complete the simulation or allow some elements to be simulated in less execution time. Thus, the term SPICE may refer to any or all variations of circuit simulators that are similar to SPICE. Thus, in some instances, the memory compiler corner database generator (MCCDG) 220 may interface with the simulator 230 to generate data and information based on one or more simulations (e.g., SPICE simulations) of the integrated circuit (IC) for a range of variations of operating conditions including a range of process, voltage, and temperature (PVT) variations.

The computing device 204 may utilize one or more databases 250, 252 that are configured to store and/or record source corner data and information associated with generating corner databases. For instance, the database(s) 250, 252 may be configured to store source corner data and information related to the integrated circuit (IC) and various data and information associated with base or source corner databases and new or destination corner databases. Further, the one or more databases 250, 252 may be configured to store source corner data and information related to the integrated circuit (IC) in reference to simulation data (e.g., SPICE simulation data).

Various implementations of methods and methodologies for generating corner databases will now be described in reference to FIGS. 3-5.

Figure 3:
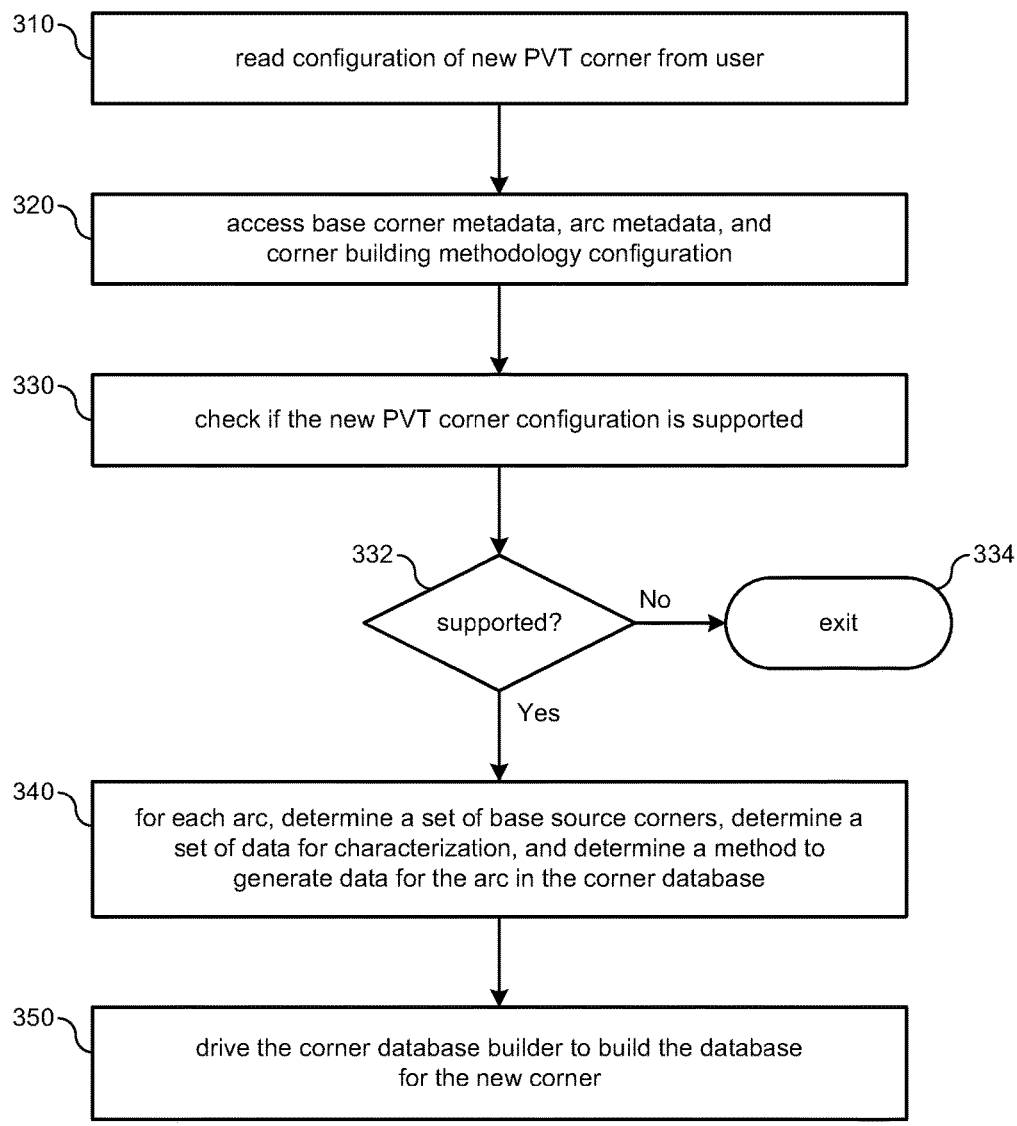
FIGS. 3-5 illustrate block diagrams of various methods for generating corner databases in accordance with various implementations described herein.

In particular, FIG. 3 illustrates a process flow diagram (or functionality flow chart) of a method 300 for implementing corner database generation in accordance with implementations described herein. It should be understood that even though method 300 may indicate a particular order of operation execution, in some cases, various portions of the operations may be executed in a different order, and on different systems. In other cases, additional operations and/or steps may be added to and/or omitted from method 300. Method 300 may be implemented in hardware and/or software. If implemented in hardware, the method 300 may be implemented with various components, as described herein above in reference to FIGS. 2A-2B. If implemented in software, method 300 may be implemented as a program or software instruction process that is configured for corner database generation in memory applications as described herein. Further, if implemented in software, various instructions related to implementing the method 300 may be stored or recorded in various types of memory. For instance, a computer, a server, or various other types of computing devices having a processor and memory may be configured to perform the method 300 and operations associated therewith.

In reference to FIG. 3, method 300 may be utilized for implementing corner database generation in memory applications. At block 310, method 300 may read a user input configuration of a new PVT corner from a user. For instance, in reference to FIGS. 2A-2B, the memory compiler corner database generator (MCCDG) 206 includes the mapper 220 (mapper module) and the corner database builder 226 (builder module). The mapper 220 reads in the user's configuration input of the new PVT corner 214, such as process, voltage, temperature, VT Mode, metal stack, etc. The PVT corner configuration input 214 may include data accuracy requirements and CPU run time requirements.

At block 320, method 300 may access base corner metadata, arc metadata, and corner building methodology configuration data, and at block 330, method 300 may check if the new PVT corner configuration is supported. For instance, in reference to FIGS. 2A-2B, the mapper 220 includes the PVT corner configuration checker 222 that checks the syntax of the input 214 and verifies that the input 214 is valid. Then, the PVT corner configuration checker 222 accesses the base corner metadata 260, the arcs metadata 262, and the corner building methodology configuration data 264 and verifies whether the data for building the new corner database 252 is available and/or verifies whether the accuracy/CPU time criteria is achievable. At decision block 332, if not supported and cannot pass the check, an error may be reported to the user, and at block 334, method 300 exits. Otherwise, if supported and passes the check, the user's input is forward to the decision making engine 224.

At block 340, for each corner, method 300 may determine a set of base source corners, determine a set of data for characterization, and determine a method to generate data for the arc in the corner database. For instance, in reference to FIGS. 2A-2B, the mapper 220 includes the decision making engine 224 that accesses the base corner metadata 260, the arcs metadata 262, the corner building methodology configuration data 264, the user's input of new PVT corner configuration 214, and then decides or determines how to build the new (destination) corner database 252. The base corner metadata 260 may include information for each existing (base/source) corner database 250 whose data may be used to build the new PVT corner database 252. The (base/source) corner database 250 may store source corner data and related information.

The base corner metadata 260 may also include source corner to destination corner mapping information. E.g., if a new fast process corner database is requested to be created, then the decision making engine 224 should not use data from slow corner databases. The arcs metadata 262 may include information of arcs, such as, e.g., a data trend of each arc for different voltage, temperature, etc., a data trend of each arc among different memory instances, an importance of accuracy of each arc, etc.

The corner building methodology configuration data 264 may include a policy on how to build data for each arc in the new PVT corner database 252. An example of a policy is that: for very important arc, do full characterization; for medium important arc, do characterization on important memory instances and do scaling on other memory instances; for non-critical arcs, do scaling. There may also be policies for characterization and scaling. E.g., characterization may be used to define how many memory instances and which instances should be characterized for each arc, as well as the simulation accuracy setup. In creating a liberty model for a compiler, arcs may not have a same importance. For instance, in defining a liberty timing model for the compiler, timing paths (arcs) for instances may not be equally important or critical. For example, setup time for clock and address pins may be important or critical with high accuracy. However, a setup timing arc for a function may be an output enable that may have high tolerance and may only use scaling since it may be a non-critical arc. Some pins may include an output enable and may have margin because they may not be in a critical path, and if accuracy tolerance for a full scale arc is within a tolerance of the setup timing arc, then choosing to perform a full scaling on such a timing arc may be acceptable. In addition, within a given access timing path (arc), there may be certain address changes that may tolerate less accuracy and may therefore tolerate some amount of scaling. However, there may be certain arc discontinuities (for more detail on discontinuities, see the discussion for FIG. 7A-7C below) as addresses change that may use a high degree of accuracy and thus use full characterization. This may not be true for all discontinuities. In general, a larger discontinuity may increase a likelihood that characterization may be used rather than some form of scaling. Thus, it may be possible that a process for creating a liberty timing rule may have different arcs, use different characterization policies, or within creating a same arc for a compiler, different addresses may use different characterization policies. Thus, the decision making engine 224 may use the corner building methodology configuration 264 to make these decisions. For scaling, a policy may define a method to be used for each arc, such as, e.g., linear scaling across temperature and bi-linear scaling across voltage. The policy may also define how to calculate parameters that may be used for scaling.

At block 350, method 300 may drive the corner database builder 226 to build the database 252 for the new corner. For instance, in reference to FIGS. 2A-2B, once the decision making engine 224 decides or determines how to build the new destination corner database 252, the MCCDG 206 may drive the corner database builder 226 (builder module) to run a simulation and build the new destination corner database 252.

Further, as shown in FIG. 2B, the corner database builder 226 may include the characterization engine 280 and the data scaling engine 282. The characterization engine 280 may be in charge of setting-up a simulation environment, running a simulation, monitoring a process of the simulation, re-running the job if an error happens, and collecting a simulation result (or results of the simulation). The data scaling engine 282 may be in charge of calculating the parameters using the simulated data, reading source corner data from the one or more source base corner databases 250, and applying a scaling method to generate data for the destination corner database 252. Then, the simulated data and the scaled data may be written (recorded or stored) into the destination corner database 252 in a predefined format by the corner database builder 226.

In some cases, the new corner database 252 may be dropped into a corner database collection of the memory compiler 208, and the new corner database 252 may be used by the memory compiler 208 to generate the one or more memory instance structures 256 (or memory instance models). Further, the new corner database 252 may be used as a new base corner database 250 to generate other new PVT corners. In this case, the base corner metadata 260 in the mapper 220 may be updated.

Figure 4:
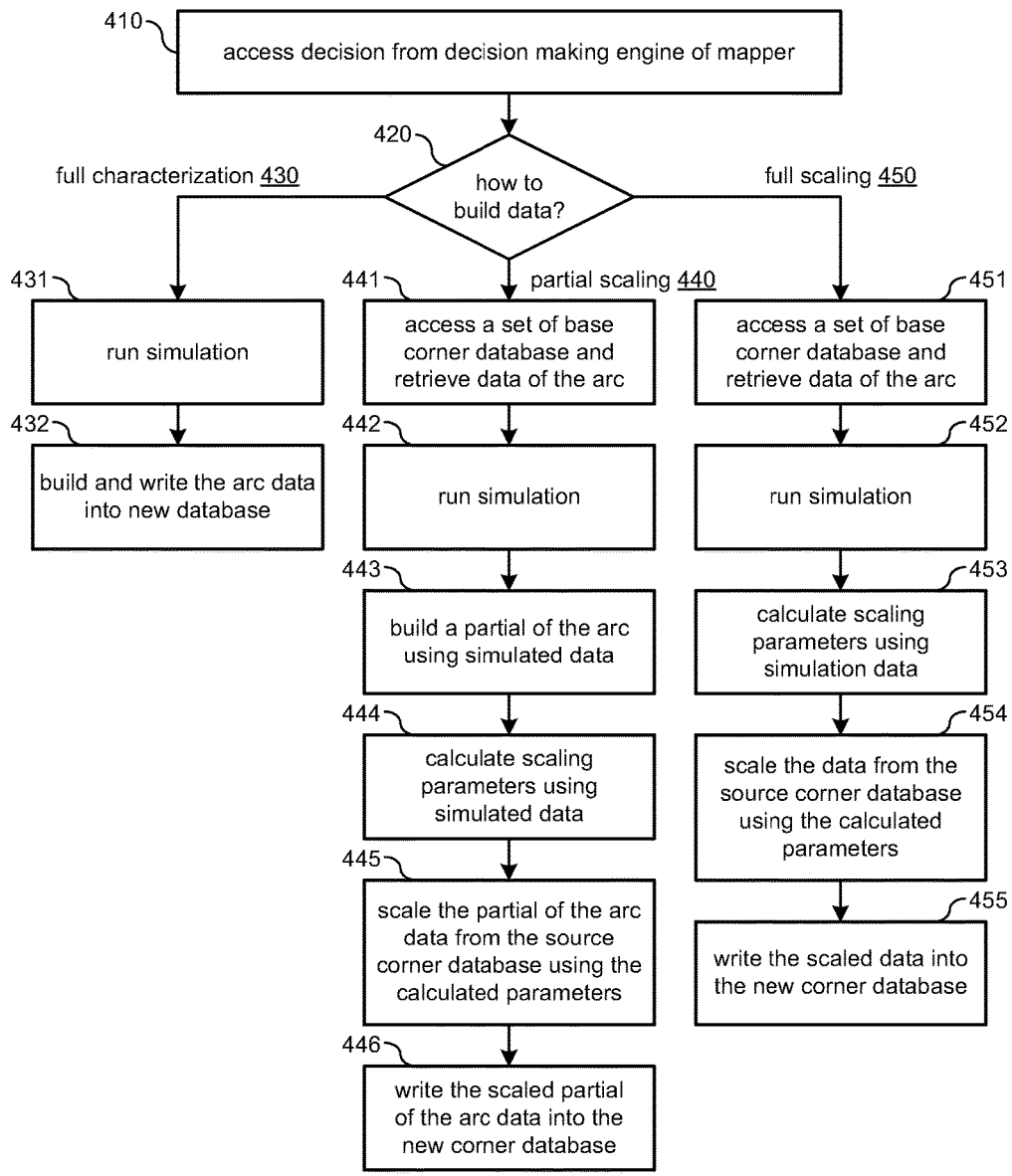

FIG. 4 illustrates a process flow diagram of a method 400 for implementing corner database generation in accordance with implementations described herein.

It should be understood that even though method 400 may indicate a particular order of operation execution, in some cases, various portions of the operations may be executed in a different order, and on different systems. In some other cases, additional operations and/or steps may be added to and/or omitted from method 400. Method 400 may be implemented in hardware and/or software. If implemented in hardware, method 400 may be implemented with various components, as described herein above in FIGS. 2A-2B. If implemented in software, method 400 may be implemented as a program or software instruction process that is configured for corner database generation in memory applications as described herein. Further, if implemented in software, various instructions related to implementing the method 400 may be stored or recorded in various types of memory. For instance, a computer, a server, or various other types of computing devices having a processor and memory may perform the method 400 and the various operations associated therewith.

In reference to FIG. 4, method 400 may be utilized for implementing corner database generation in memory applications. At block 410, method 400 may access the decision from the decision making engine 224 of the mapper 220. For instance, as described in reference to FIG. 2B, once the decision making engine 224 decides how to build the new destination corner database 252, the corner database builder 226 may access the decision from the decision making engine 224 of the mapper 220. Further, at decision block 420, method 400 may decide (or determine) how to build the data. For instance, the MCCDG 206 may drive the corner database builder 226 to run a simulation and build the new destination corner database 252. Alternatively, the decision making engine 224 may make the decisions outlined in decision block 420.

If a full characterization 430 is decided, then at block 431, method 400 runs a simulation, and at block 432, method 400 builds and writes the arc data into the new corner database 252.

If a partial scaling 440 is decided, then at block 441, method 400 accesses a set of base corner databases 252 and retrieves data of the arc. At block 442, method 400 runs a simulation, and at block 443, method 400 builds a partial of the arc using simulated data. At block 443, method 400 calculates scaling parameters using the simulated data, and at block 445, method 400 scales the partial of the arc data from the source corner database 250 using the calculated parameters. Further, at block 446, method 400 writes the scaled partial of the arc data into the new corner database 252.

If a full scaling 450 is decided, then at block 451, method 400 accesses a set of base corner databases 252 and retrieves data of the arc. At block 452, method 400 runs a simulation, and at block 453, method 400 calculates scaling parameters using the simulated data. Further, at block 454, method 400 scales the source corner data from the source corner database 250 using the calculated parameters, and at block 455, method 400 writes the scaled data into the new corner database 252.

In some implementations, method 400 may combine (or at least provide some combination of) characterization and scaling (full or partial). As such, the decision making engine 224 may control decisions associated with full characterization 430, partial scaling 440, full scaling 450, and/or various combinations thereof. The decision making engine 224 may further control these selections (or choices) that may occur for arc selections (or choices) within the process of building the new corner database 252. The builder 226 may perform the work of building, but it does so at the direction (or the discretion) of the decision making engine 224.

Figure 5:
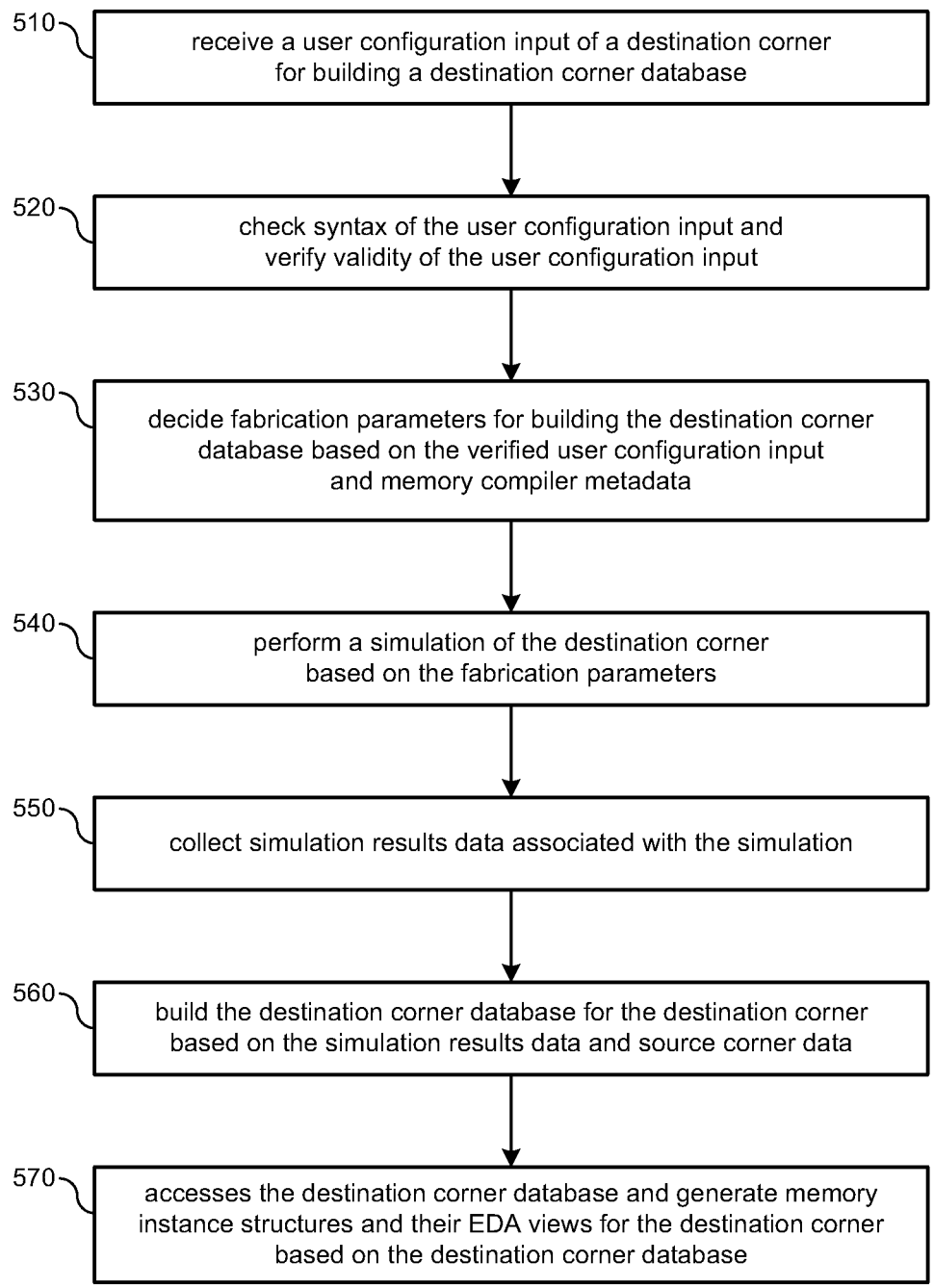

FIG. 5 illustrates a process flow diagram of a method 500 for implementing corner database generation in accordance with implementations described herein.

It should be understood that even though method 500 may indicate a particular order of operation execution, in some cases, various certain portions of operations may be executed in a different order, and on different systems. In some other cases, additional operations and/or steps may be added to and/or omitted from method 500. Method 500 may be implemented in hardware and/or software. If implemented in hardware, method 500 may be implemented with various components, such as described herein above in reference to FIGS. 2A-2B. If implemented in software, method 500 may be implemented as a program or software instruction process that may be configured for corner database generation as described herein. Further, if implemented in software, various instructions related to implementing method 500 may be stored in various types of memory, wherein a computer, a server, or various other types of computing devices having a processor and memory may be configured to perform method 500.

In reference to FIG. 5, method 500 may be utilized for implementing corner database generation in memory applications. At block 510, method 500 may receive a user configuration input of a destination corner for building a destination corner database. At block 520, method 500 may check syntax of the user configuration input and verify validity of the user configuration input. At block 530, method 500 may decide (or determine) fabrication parameters for building the destination corner database based on the verified user configuration input and the memory compiler metadata (e.g., base corner metadata, arc metadata, and corner building methodology configuration data).

Further, at block 540, method 500 may perform a simulation of the destination corner based on the fabrication parameters. In some implementations, at block 540, method 500 may perform one or more simulations of the destination corner based on the fabrication parameters, wherein each of the one or more simulations may involve a full characterization, a full scaling, a partial scaling, or various combinations thereof. At block 550, method 500 may collect simulation results data associated with the simulation. In some implementations, at block 550, method 500 may collect simulation results data associated with one or more simulations of the destination corner, and if necessary, method 500 may combine simulation results data of the different types of simulation (e.g., full characterization, full scaling, partial scaling, or various combinations thereof), as necessary, based on accuracy requirements of each individual arc.

At block 560, method 500 may build the destination corner database for the destination corner based on the simulation results data and the source corner data. At block 570, method 500 may access the destination corner database and generate memory instance structures and their electronic digital automation (EDA) views for the destination corner based on the destination corner database.

In some implementations, method 500 may prepare a simulation environment for performing simulation of the destination corner based on the fabrication parameters, perform the simulation, monitor a process of the simulation, re-perform the simulation if an error occurs, and collect simulation results data. Further, method 500 may calculate the fabrication parameters using the simulation results data, retrieve base corner data from a base corner database, and generate destination corner data for the destination corner database based on the simulation results data and the base corner data. Further, method 500 may collect and store the destination corner data in the destination corner database in a predefined format, and method 500 may retrieve the destination corner data from the destination corner database and generate the memory instance structures and their electronic digital automation (EDA) views for the destination corner based on the destination corner data retrieved from the destination corner database.

Figure 6:
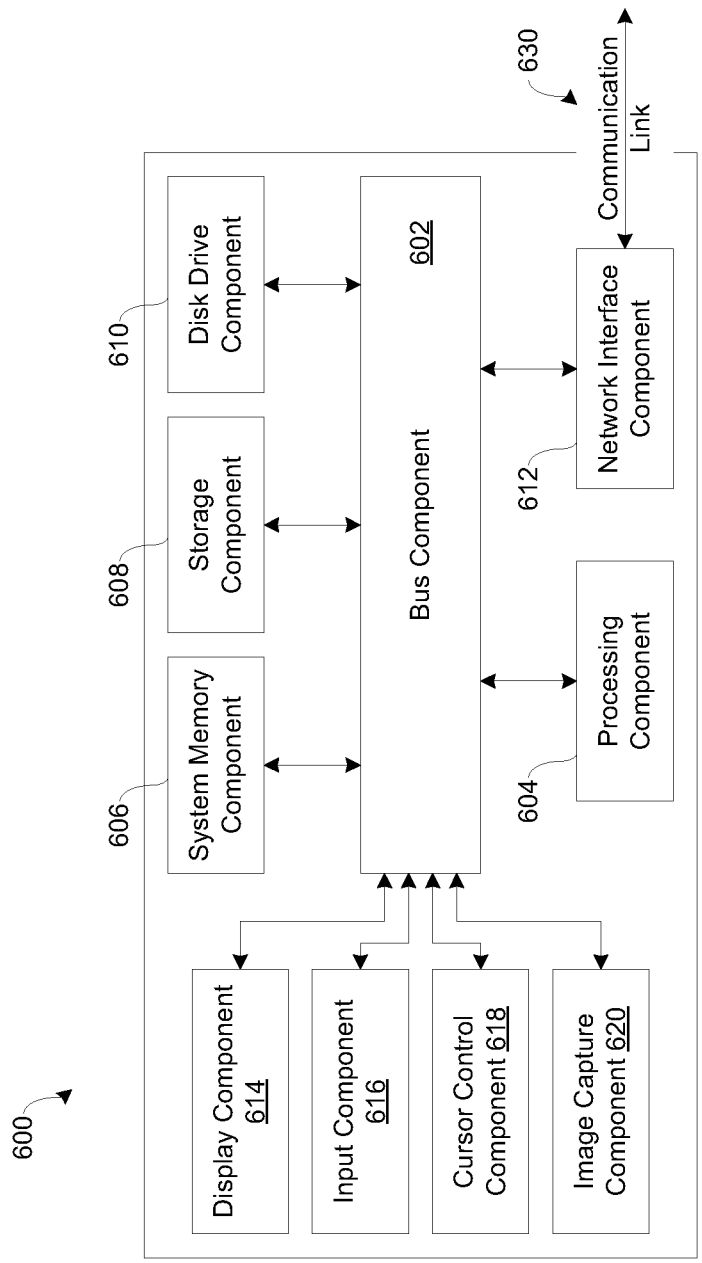
FIG. 6 illustrates a block diagram of a computing device in accordance with various implementations described herein.

FIG. 6 is a block diagram of a computing device 600 suitable for implementing various implementations described herein, including components of the computing device 204 of FIG. 2A. In some implementations, the computing device 600 may be embodied as the computing device 204 and be configured for network communication with various other computing devices over a wired or wireless network.

The computer device 600 may be implemented as various types of computing devices, such as, e.g., a server, a personal computer (PC), a laptop, a notebook, a mobile communication device, or similar. The computer device 600 may include a bus 602 (or other communication mechanism for communicating information) that interconnects the various subsystems and/or components, such as, e.g., processing component 604 (e.g., processor, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), cursor control component 618 (e.g., mouse or trackball), and image capture component 620 (e.g., analog or digital camera). In some implementations, disk drive component 610 may comprise a database having one or more disk drive components.

The computer device 600 performs various specific operations by processor 604 executing one or more sequences of one or more instructions contained in system memory component 606. Such instructions may be read into system memory component 606 from another computer readable medium, such as static storage component 608 or disk drive component 610. In some cases, hard-wired circuitry may be used in place of or in combination with software instructions to implement the various schemes and/or techniques described herein.

Logic may be encoded in a computer readable medium, which may refer to any medium that participates in providing instructions to processor 604 for execution. Such a medium may take many forms, including but not limited to, non-volatile media and volatile media. In various implementations, non-volatile media includes optical or magnetic disks, such as disk drive component 610, and volatile media includes dynamic memory, such as system memory component 606. In some implementations, data and information related to execution instructions may be transmitted to computer device 600 via a transmission media, such as in the form of acoustic or light waves, including those generated during radio wave and infrared data communications. In various implementations, transmission media may include coaxial cables, copper wire, and/or fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the schemes and techniques described herein may be performed by computer device 600. In other implementations described herein, a plurality of computer systems 600 coupled by communication link 630 (e.g., LAN, WLAN, PTSN, and/or various other wired or wireless networks, including telecommunications, mobile, and/or cellular phone networks) may perform instruction sequences to practice implementations of the present disclosure in coordination with one another.

In various implementations, the computer device 600 may transmit and receive messages, data, information and instructions, including programs (i.e., application code) through communication link 630 and communication interface 612. Further, the received program code may be executed by the processor 604 as received and/or stored in disk drive component 610 or some other non-volatile storage component for execution.

Figure 7A:
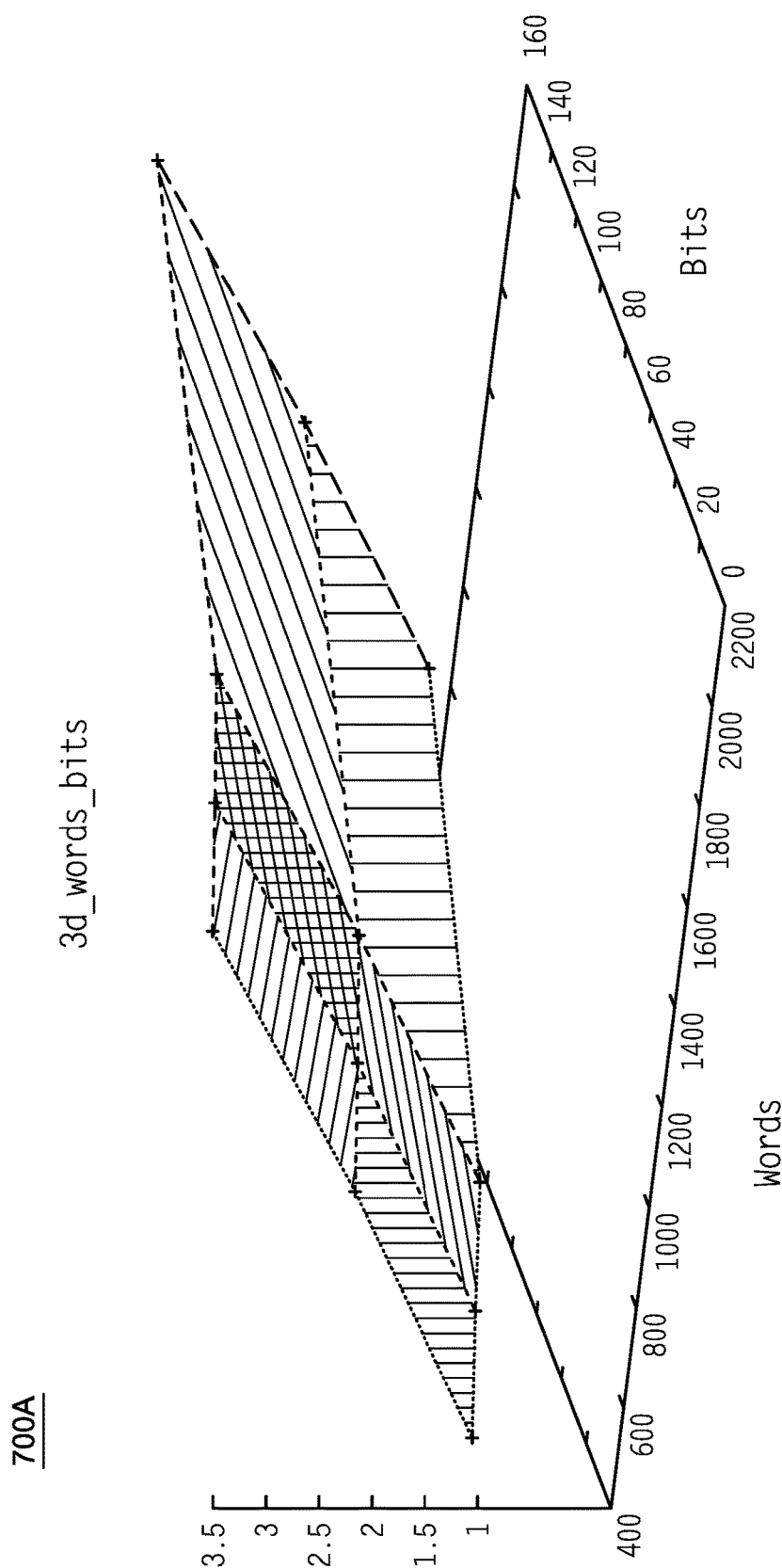
FIGS. 7A-7C illustrate various graphical diagrams of how an arc (access time) changes with different sizes of memory instances in accordance with implementations described herein.
Figure 7B:
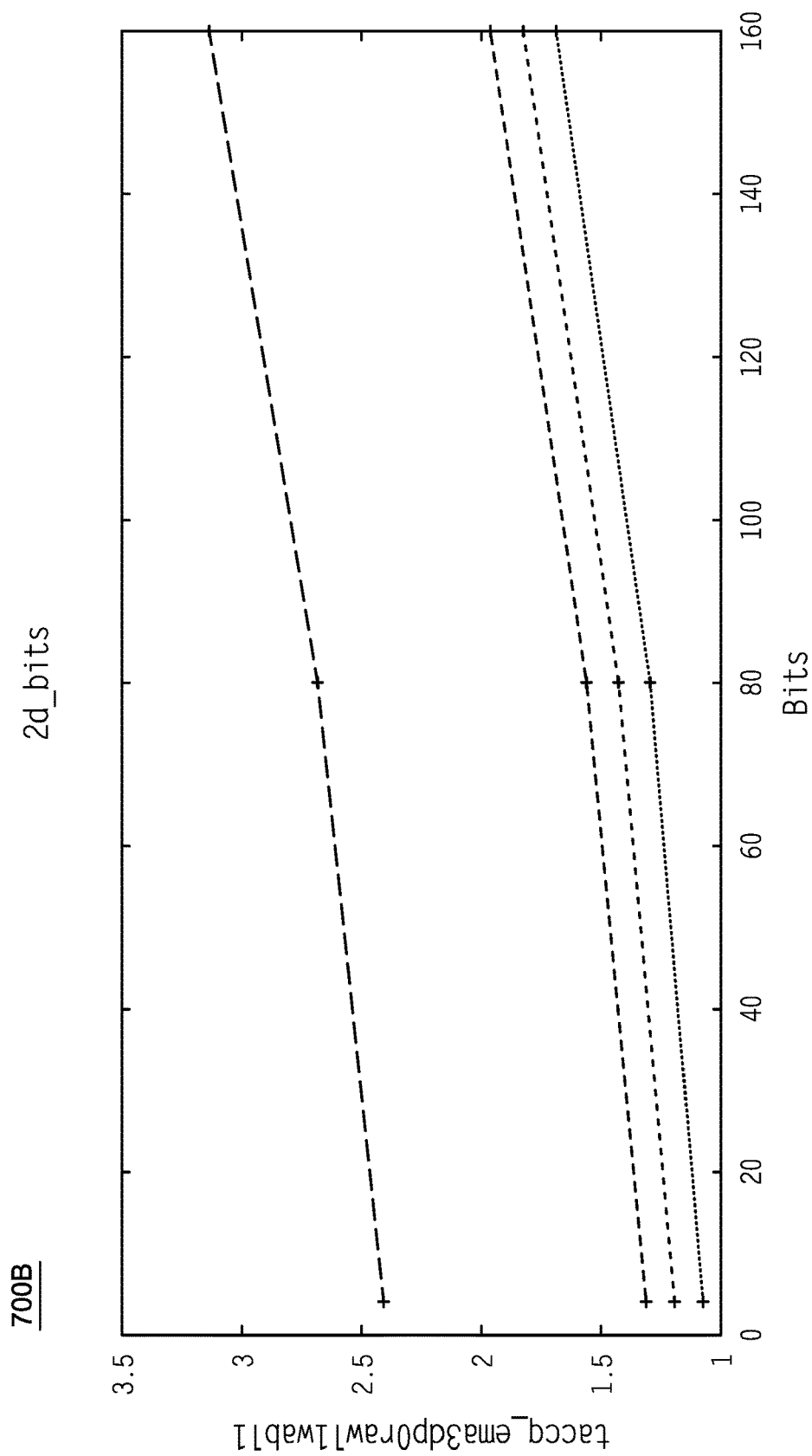
Figure 7C:
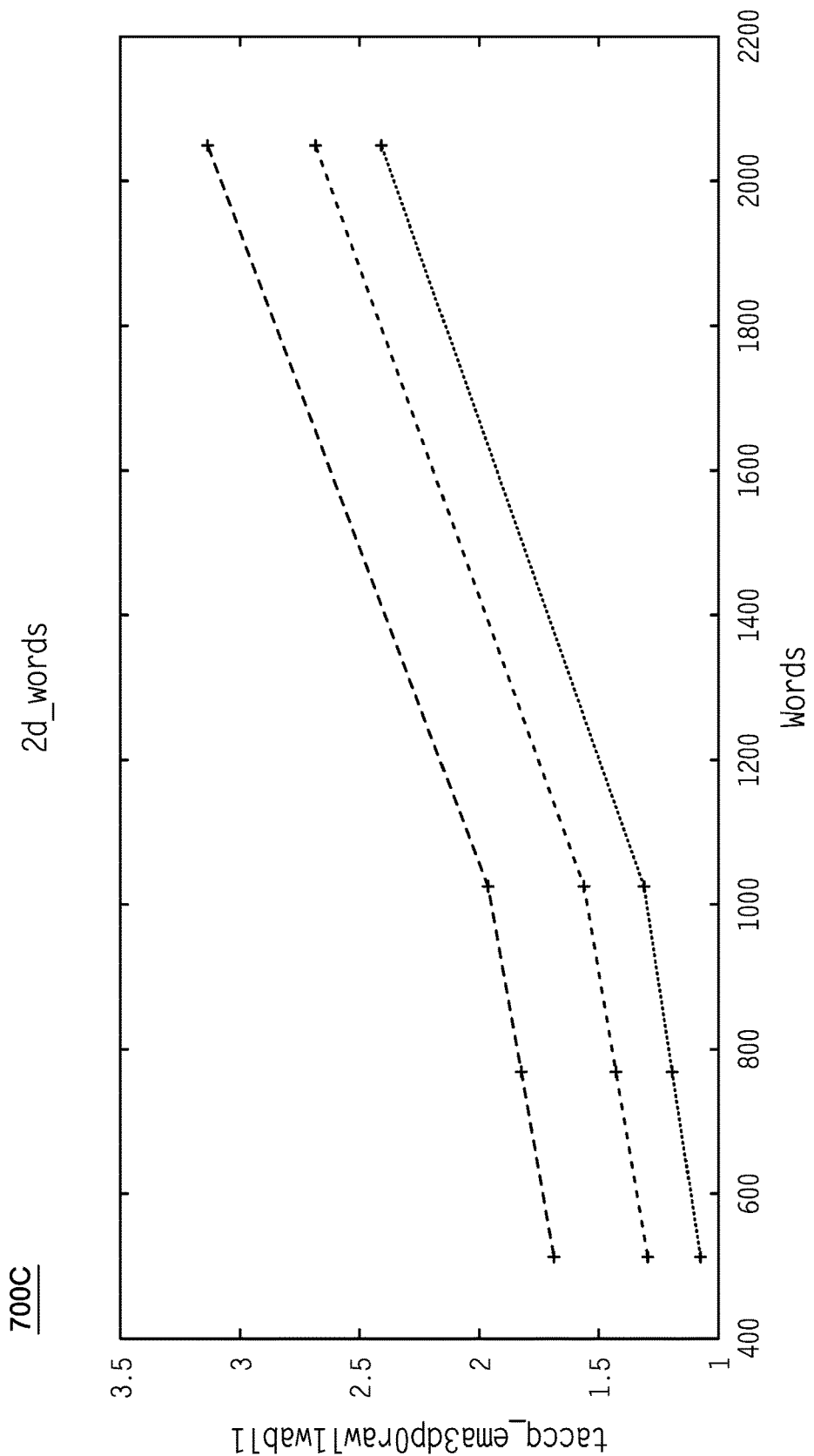

FIGS. 7A-7C illustrate various graphical diagrams of how an arc (access time) changes with different sizes of memory instances in accordance with implementations described herein. Memory size may be defined by words×bits.

In particular, as shown in FIG. 7A, the graphical diagram (3d_words_bits) is a three-dimensional (3D) drawing showing (arc) access time changes with words and bits. As shown in FIG. 7B, the graphical diagram (2d_bits) is a two-dimensional (2D) drawing showing (arc) access time changes with bits, wherein each line represents different words. As shown in FIG. 7C, the graphical diagram (2d_words) is a 2D drawing showing (arc) access time changes with words, wherein each line represents different bits.

For this memory compile and this arc, the words break point are at words=1024, and the bits break points are at bits=80. In some cases, this information may be defined in the arcs metadata 262 of the mapper 220, which may be used by the decision making engine 224 to make decisions.

In some implementations, the characterization of a memory compiler may use selected memory instances to define critical timing arcs. These critical timing arcs may be tied directly to the memory design and organization. For instance, in cases of building timing arcs for memory access, organization of the memory changes at certain increases in word or output bit addresses. For instance, as a number of word addresses, a memory design may go from a single bank of memory to two banks of memories. This physical change in organization may cause a discontinuous change in (arc) access time as shown in FIG. 7C when the memory size increases beyond 1024 words. This is a number of words that may cause this memory design to increase from one physical bank to two physical banks. The (arc) access time may normally increase in a predictable fashion that may be easily modeled within a single bank until this discontinuity occurs.

However, when address size increases beyond what may be contained within a single bank, the access time may not follow the modeling of the changes seen within the single bank. An understanding of the actual physical organization may be needed to know where the discontinuities or break points occur in each design. Sometimes, knowing where these are may allow for proper characterization of the precise memory instances to define an exact change in memory address. If these changes are not well understood, then the actual modeling of the change in (arc) access time with increase in address space may not be properly represented. Thus, knowledge of memory design and architecture may be needed to relate an exact change in address space to a change in access time. This may be applied, e.g., as shown in FIG. 7C, which shows a change when the number of words is varied, or in FIG. 7B, which shows a change when the number of output bits is also varied. FIG. 7A shows a 3D graph of an interaction of these word and bit changes. In this example, only one discontinuity at the word address and one discontinuity at the bit address is shown. However, depending on the memory design architecture, and the range in addresses being viewed, there may be multiple discontinuities, e.g., going from one bank to two banks to 4 banks or 8 banks. In various cases, this understanding of discontinuities inherent in each design may be incorporated into the decision making engine 224 of the mapper 220, which may decide and thus select between full characterization, full scaling, or partial scaling.

Described herein are various implementations of a computing device. The computing device may include a mapper module that receives a user configuration input of a destination corner for building a destination corner database. The mapper module may include a decision making engine that decides fabrication parameters for building the destination corner database based on the verified user configuration input and memory compiler metadata. The computing device may include a builder module that performs a simulation of the destination corner based on the fabrication parameters, collects simulation results data associated with the simulation, and builds the destination corner database for the destination corner based on the simulation results data and source corner data. The computing device may include a memory compiler that accesses the destination corner database and generates memory instance structures and their electronic digital automation (EDA) views for the destination corner based on the destination corner database.

Described herein are various implementations of a system having a processor and memory having stored thereon instructions that, when executed by the processor, cause the processor to receive a user configuration input of a destination corner for building a destination corner database, decide fabrication parameters for building the destination corner database based on the verified user configuration input and memory compiler metadata, and perform at least one simulation of the destination corner based on the fabrication parameters. The at least one simulation may be a full characterization, a full scaling, a partial scaling, or combinations thereof. The instructions may cause the processor to collect simulation results data associated with the at least one simulation, build the destination corner database for the destination corner based on the simulation results data and source corner data, and access the destination corner database and generate memory instance structures and their electronic digital automation (EDA) views for the destination corner based on the destination corner database.

Described herein are various implementations of a non-transitory computer-readable medium having stored thereon a plurality of computer-executable instructions which, when executed by a computer, cause the computer to receive a user configuration input of a destination corner for building a destination corner database, decide fabrication parameters for building the destination corner database based on the verified user configuration input and memory compiler metadata, and perform a simulation of the destination corner based on the fabrication parameters. The instructions may cause the computer to collect simulation results data associated with the simulation, build the destination corner database for the destination corner based on the simulation results data and source corner data, and access the destination corner database and generate memory instance structures and their electronic digital automation (EDA) views for the destination corner based on the destination corner database.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   a mapper module that receives a user configuration input of a destination corner for building a destination corner database, wherein the mapper module includes a decision making engine that decides fabrication parameters for building the destination corner database based on the verified user configuration input and memory compiler metadata;
   a builder module that performs a simulation of the destination corner based on the fabrication parameters, collects simulation results data associated with the simulation, and builds the destination corner database for the destination corner based on the simulation results data and source corner data; and
   a memory compiler that accesses the destination corner database and generates memory instance structures and their electronic digital automation (EDA) views for the destination corner based on the destination corner database.

2. The computing device of claim 1, wherein the destination corner is a process corner that is defined by variation of fabrication parameters used in applying an integrated circuit design to a semiconductor wafer.

3. The computing device of claim 2, wherein the process corner identifies parameter variations within the integrated circuit that allow an integrated circuit to function properly when the integrated circuit is etched onto the semiconductor wafer.

4. The computing device of claim 1, wherein the destination corner is a new process, voltage, temperature (PVT) corner, and wherein the user configuration input includes data accuracy conditions and central processing unit (CPU) runtime criteria.

5. The computing device of claim 4, wherein the mapper module includes a configuration checker that checks syntax of the user configuration input and verifies validity of the user configuration input, and wherein the configuration checker accesses memory compiler metadata and verifies availability of the memory compiler metadata for building the destination corner database.

6. The computing device of claim 5, wherein the configuration checker determines whether the data accuracy conditions and the CPU runtime criteria is achievable based on the memory compiler metadata, and wherein if not achievable, then the configuration checker reports an error, and wherein if achievable, then the user configuration input is provided to the decision making engine as the verified user configuration input.

7. The computing device of claim 6, wherein the decision making engine accesses the memory compiler metadata, receives the verified user configuration input for the destination corner, and then decides the fabrication parameters for building the destination corner database based on the verified user configuration input and the memory compiler metadata.

8. The computing device of claim 5, wherein the memory compiler metadata comprises base corner metadata, arcs metadata, and corner building methodology configuration data.

9. The computing device of claim 8, wherein the base corner metadata comprises:
   data and information for one or more existing corner databases that is useable for building the destination corner database as a new PVT corner database; and
   source corner to destination corner mapping data and information.

10. The computing device of claim 9, wherein the arcs metadata includes data and information of one or more arcs, including a data trend of each arc for different voltages and different temperatures, and wherein the data trend of each arc is associated with different memory instance structures and the accuracy of each arc.

11. The computing device of claim 10, wherein the corner building methodology configuration data includes policy related data and information on fabrication parameters for building data for each arc in the new PVT corner database, and wherein the policy related data and information is associated with performing characterization, scaling, or some combination thereof when building the data for each arc in the new PVT corner database.

12. The computing device of claim 1, wherein the builder module comprises:
   a characterization engine that prepares a simulation environment for performing the simulation of the destination corner based on the fabrication parameters, performs the simulation, monitors a process of the simulation, re-performs the simulation if an error occurs, and collects the simulation results data.

13. The computing device of claim 12, wherein the builder module comprises:
   a scaling engine that calculates the fabrication parameters using the simulation results data, retrieves base corner data from a base corner database, and generates destination corner data for the destination corner database based on the simulation results data and the base corner data.

14. The computing device of claim 13, wherein the builder module collects and stores the destination corner data in the destination corner database in a predefined format, and wherein the memory compiler retrieves the destination corner data from the destination corner database and generates the memory instance structures and their electronic digital automation (EDA) views for the destination corner based on the destination corner data retrieved from the destination corner database.

15. A system comprising:
   a processor; and
   memory having stored thereon instructions that, when executed by the processor, cause the processor to:
      receive a user configuration input of a destination corner for building a destination corner database;
      decide fabrication parameters for building the destination corner database based on the verified user configuration input and memory compiler metadata;
      perform at least one simulation of the destination corner based on the fabrication parameters, wherein the at least one simulation is a full characterization, a full scaling, a partial scaling, or combinations thereof;
      collect simulation results data associated with the at least one simulation,
      build the destination corner database for the destination corner based on the simulation results data and source corner data, and
      access the destination corner database and generate memory instance structures and their electronic digital automation (EDA) views for the destination corner based on the destination corner database.

16. The system of claim 15, wherein the destination corner is a process corner that is defined by variation of fabrication parameters used in applying an integrated circuit design to a semiconductor wafer.

17. The system of claim 15, wherein the memory includes instructions that, when executed by the processor, cause the processor to:
   prepare a simulation environment for performing the simulation of the destination corner based on the fabrication parameters,
   perform the simulation,
   monitor a process of the simulation,
   re-perform the simulation if an error occurs, and
   collect the simulation results data.

18. The system of claim 17, wherein the memory includes instructions that, when executed by the processor, cause the processor to:
   calculate the fabrication parameters using the simulation results data,
   retrieve base corner data from a base corner database, and
   generate destination corner data for the destination corner database based on the simulation results data and the base corner data.

19. The system of claim 18, wherein the memory includes instructions that, when executed by the processor, cause the processor to:
   collect and store the destination corner data in the destination corner database in a predefined format, and
   retrieve the destination corner data from the destination corner database and generate the memory instance structures and their electronic digital automation (EDA) views for the destination corner based on the destination corner data retrieved from the destination corner database.

20. A non-transitory computer-readable medium having stored thereon a plurality of computer-executable instructions which, when executed by a computer, cause the computer to:
   receive a user configuration input of a destination corner for building a destination corner database,
   decide fabrication parameters for building the destination corner database based on the verified user configuration input and memory compiler metadata,
   perform a simulation of the destination corner based on the fabrication parameters,
   collect simulation results data associated with the simulation,
   build the destination corner database for the destination corner based on the simulation results data and source corner data, and
   access the destination corner database and generate memory instance structures and their electronic digital automation (EDA) views for the destination corner based on the destination corner database.

* * * * *